United States Patent
Hills et al.

(10) Patent No.: US 6,680,924 B2
(45) Date of Patent: Jan. 20, 2004

(54) METHOD FOR ESTIMATING SIGNAL STRENGTHS

(75) Inventors: Alexander H. Hills, Palmer, AK (US); Jon P. Schlegel, Vienna, VA (US); Benjamin C. Jenkins, Clifton, NJ (US)

(73) Assignee: Carnegie Mellon University, Pittsburgh, PA (US)

( * ) Notice: Subject to any disclaimer, the term of this patent is extended or adjusted under 35 U.S.C. 154(b) by 553 days.

(21) Appl. No.: 09/737,184

(22) Filed: Dec. 14, 2000

(65) Prior Publication Data

US 2002/0075825 A1 Jun. 20, 2002

(51) Int. Cl.$^7$ .................................................. H04Q 7/00
(52) U.S. Cl. ...................................... 370/329; 370/338
(58) Field of Search ................................ 370/328, 329, 370/331–334, 338, 339, 341, 350, 401, 901, 902, 908, 910–913, 254, 252, 241, 245, 247, 248, 251, 255, 465, 467; 725/123, 127; 455/456.1, 456.2, 456.6, 440, 452.2, 436, 441, 442, 453, 69; 375/229, 347, 345, 346, 348, 349, 368, 367, 227, 232

(56) References Cited

U.S. PATENT DOCUMENTS

| | | | |
|---|---|---|---|
| 4,868,877 A | 9/1989 | Fischer | 713/157 |
| 4,926,480 A | 5/1990 | Chaum | 705/69 |
| 5,224,162 A | 6/1993 | Okamoto et al. | 705/69 |
| 5,420,926 A | 5/1995 | Low et al. | 705/74 |
| 5,479,494 A | 12/1995 | Clitherow | 379/114.15 |
| 5,513,250 A | 4/1996 | McAllister | 379/91.02 |
| 5,557,518 A | 9/1996 | Rosen | 705/69 |
| 5,592,553 A | 1/1997 | Guski et al. | 713/159 |
| 5,661,807 A | 8/1997 | Guski et al. | 713/159 |
| 5,712,913 A | 1/1998 | Chaum | 705/74 |
| 5,839,052 A * | 11/1998 | Dean et al. | 725/106 |
| 5,884,187 A * | 3/1999 | Ziv et al. | 455/522 |
| 5,924,084 A | 7/1999 | De Rooij | 705/39 |
| 5,956,699 A | 9/1999 | Wong et al. | 705/39 |
| 5,963,915 A | 10/1999 | Kirsch | 705/26 |
| 6,000,832 A | 12/1999 | Franklin et al. | 700/232 |
| 6,014,646 A | 1/2000 | Vallee et al. | 705/39 |
| 6,029,150 A | 2/2000 | Kravitz | 705/39 |
| 6,047,270 A | 4/2000 | Joao et al. | 705/44 |
| 6,049,785 A | 4/2000 | Gifford | 705/39 |
| 6,052,598 A * | 4/2000 | Rudrapatna et al. | 455/456.1 |
| 6,119,101 A | 9/2000 | Peckover | 705/26 |
| 6,175,921 B1 | 1/2001 | Rosen | 713/173 |
| 6,185,683 B1 | 2/2001 | Ginter et al. | 710/36 |
| 6,189,096 B1 | 2/2001 | Haverty | 713/155 |
| 6,385,454 B1 * | 5/2002 | Bahl et al. | 455/450 |

FOREIGN PATENT DOCUMENTS

| | | |
|---|---|---|
| WO | WO 00/49586 | 8/2000 |
| WO | WO 00/62259 | 10/2000 |

OTHER PUBLICATIONS

International Search Report dated May 24, 2001, PCT Patent Application No. PCT/IL01/00022.

* cited by examiner

*Primary Examiner*—Dang Ton
(74) *Attorney, Agent, or Firm*—Kirkpatrick & Lockhart LLP

(57) ABSTRACT

A method for estimating signal strengths for a wireless environment. The method includes measuring a strength of a first radio signal at a plurality of locations in the environment, wherein the first radio signal is transmitted from a radio transmitter at a first location, estimating the strength of the first radio signal at each of the plurality of locations, and estimating a strength of a second radio signal at the plurality of locations, wherein the second radio signal corresponds to a signal transmitted from one of the plurality of locations, based on a difference between the measured signal strength and the estimated signal strength for the first radio signal.

15 Claims, 6 Drawing Sheets

METHOD FOR ESTIMATING SIGNAL STRENGTHS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF INVENTION

1. Field of Invention

The present invention is directed generally to wireless communication networks and, more particularly, to methods for estimating signal strengths in the design of wireless communication networks.

2. Description of the Background

Wireless local area networks (WLANs) were originally intended to allow wireless connections to a wired local area network (LAN), such as where premises wiring systems were nonexistent or inadequate to support conventional wired LANs. A block diagram of a typical WLAN 10 is illustrated in FIG. 1. The WLAN 10 includes a mobile device 12 including a network adapter (NA) 14, a number of access points (APs) $16_{1-n}$, and a wired LAN 18. The APs 16 may be radio base stations, each mounted in a separate fixed position and connected to the wired LAN 18. The NA 14 communicates with the APs 16 by formatted wireless communication signals to provide an interface between the computing device 12 and the wired LAN 18. Because network adapters 14 are now available in compact PC card form, WLANs are often used to service mobile computing devices, such as laptop computers and personal digital assistants (PDAs), thus providing mobile connectivity to data networks, such as the Internet or an intranet.

In designing a WLAN, care must be taken in locating the APs 16 to ensure adequate radio coverage throughout the service area of the WLAN 10, while minimizing the costs associated with the installation of each AP 16. The APs 16 must be configured to eliminate coverage gaps and to provide adequate coverage for areas of highly-concentrated wireless traffic. The APs 16, however, must not be placed so closely that proximate APs 16 interfere with each other. Implementing a WLAN 10 inside a building complicates the design because the layout and construction of the building affect the wireless signal transmissions between the NAs 14 and the APs 16. For example, while wood, plaster, and glass are not serious barriers to the WLAN radio transmissions, brick and concrete walls can attenuate the signals beyond an acceptable threshold. In addition, the greatest obstacle to the wireless transmissions between the NAs 14 and APs 16 commonly found in all building environments is metal. For example, the metal used in desks, filing cabinets, reinforced concrete, and elevator shafts can significantly attenuate the signals transmitted between the NAs 14 and the APs 16, thus degrading network performance.

In addition, the communication schemes for transmitting signals between the NAs 14 of the mobile devices 12 and the APs 16 are typically contention-oriented, such as those compliant with, for example, the IEEE 802.11 protocol, in order that all the mobile units in the environment may share the limited bandwidth resource. Such a contention-oriented protocol makes signal interference between the APs 16 undesirable because if one AP 16 can "hear" another, it will defer to the other just as it would defer to a mobile device transmitting within its coverage area. Thus, signal interference between APs 16 degrades performance. Similarly, if a mobile device 12 can be heard by more than one AP 16, all the APs 16 in communication with the mobile device will defer.

Because radio propagation inside a building is frequently anomalous and seldom completely predictable, the design process for an indoor wireless installation is ordinarily iterative, including steps for (i) determination of an initial design, (ii) adjustment of the initial design, and (iii) final measurement and documentation. After the initial design is complete, the APs 16 may be temporarily installed at the locations specified in the initial design. The coverage areas of these points and the overlaps in the coverage area may be measured. Typically, coverage gaps and/or excessive overlaps are found. Based on the measured results, the AP locations may be adjusted as needed. Thereafter, more measurements may be taken and the installation reconfigured until an acceptable installation is found.

The step of adjusting the locations of the APs 16 in order to re-test the configuration of the installation is expensive and time consuming. It commonly requires reconfiguring the locations of the APs 16 and generating additional sets of signal strength measurements to determine whether coverage gaps and/or excessive overlaps exist. Accordingly, there exists a need for a manner in which to efficiently estimate AP coverage patterns in an indoor wireless installation.

BRIEF SUMMARY OF INVENTION

According to one embodiment, the present invention is directed to a method for estimating signal strengths for a wireless environment. The method includes measuring a strength of a first radio signal at a plurality of locations in the environment, wherein the radio signal is transmitted from a radio transmitter at a first location, estimating the strength of the first radio signal at each of the plurality of locations, and estimating a strength of a second radio signal at the plurality of locations, wherein the second radio signal corresponds to a signal transmitted from one of the plurality of locations, based on a difference between the measured signal strength and the estimated signal strength for the first radio signal.

The present invention provides an advantage over prior art techniques for determining whether a particular configuration of radio transmitters for an environment, especially access points for a wireless indoor LAN, will be acceptable without having to physically move radio transmitters throughout the environment to generate signal strength measurements for each possible configuration. Accordingly, the present invention is more time efficient and less expensive than prior art techniques. These and other benefits of the present invention will be apparent from the detailed description hereinbelow.

DESCRIPTION OF THE FIGURES

For the present invention to be clearly understood and readily practiced, the present invention will be described in conjunction with the following figures, wherein.

DETAILED DESCRIPTION OF THE INVENTION

Figure 1:
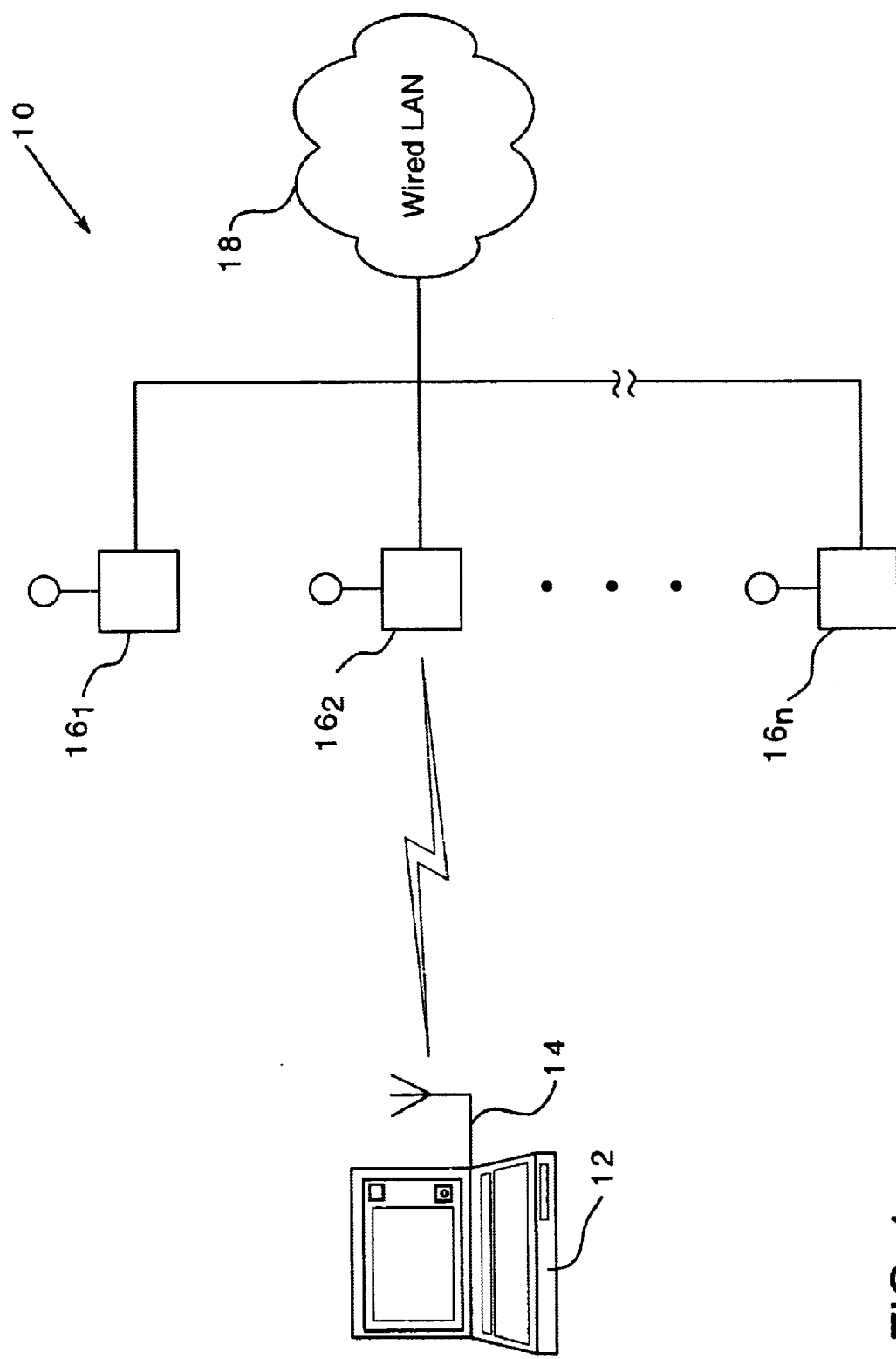
FIG. 1 is a block diagram of a wireless local area network (WLAN)

According to one embodiment, the present invention is directed to a method for estimating the coverage patterns of access points of a wireless network, such as the WLAN 10 illustrated in FIG. 1, for a particular environment such as, for example, an indoor environment. The WLAN 10 may be, for example, an IEEE 802 compliant network such as, for example, an IEEE 802.11 WLAN. The wired LAN 18 may be in communication with the APs 16 through a router (not shown), such as a 7500 series router available from Cisco Systems, Inc., a number of switches (not shown), such as Catalyst® 5000 and 1924 series switches, and a hub (not shown), such as a Bay Networks 2813 hub. These components may communicate, for example, via 100BASE-T, 10BASE-T, 100BASE-FL, and 10BASE-FL communication links.

The computing device 12 may be, for example, a laptop computer or a personal digital assistant (PDA), and may communicate with the APs 16, and therefore the wired LAN 18, via the network adapter (NA) 14. The NA 14 may include a transmitter, a receiver, an antenna, and hardware to provide a data interface between the computing device 12 and the APs 16. According to one embodiment, the NA 14 is a compact PC card installed in the computing device 12. The WLAN 10 may operate, for example, in the unlicensed ISM bands at 915 MHz, 2.4 GHz, and 5.7 GHz. Spread spectrum techniques such as, for example, direct sequence and frequency hopping, may be used at these frequencies.

The APs 16 may be, for example, WavePoint™ access points, available from Lucent Technologies, Inc. Each AP 16 may be a wireless base station that is mounted in a fixed position. Each AP 16 allows network adapter-equipped computing devices 12 to communicate with the wired LAN 18. The APs 16 may include a transmitter, receiver, an antenna, and a bridge. The bridge routes packets of data to and from the wired LAN 18 as appropriate. The APs 16 may be configured to ensure adequate wireless signal coverage throughout the service area of the WLAN 10. APs 16 typically have a range of up to 250 meters in an open environment. However, in an indoor environment, the range may be reduced to 30–60 meters because of building obstacles. For an embodiment in which some of the APs 16 are mounted within a building, this requires that the APs 16 be configured within the building to provide adequate coverage despite the many obstacles to wireless signal transmission presented by the building.

Figure 2:
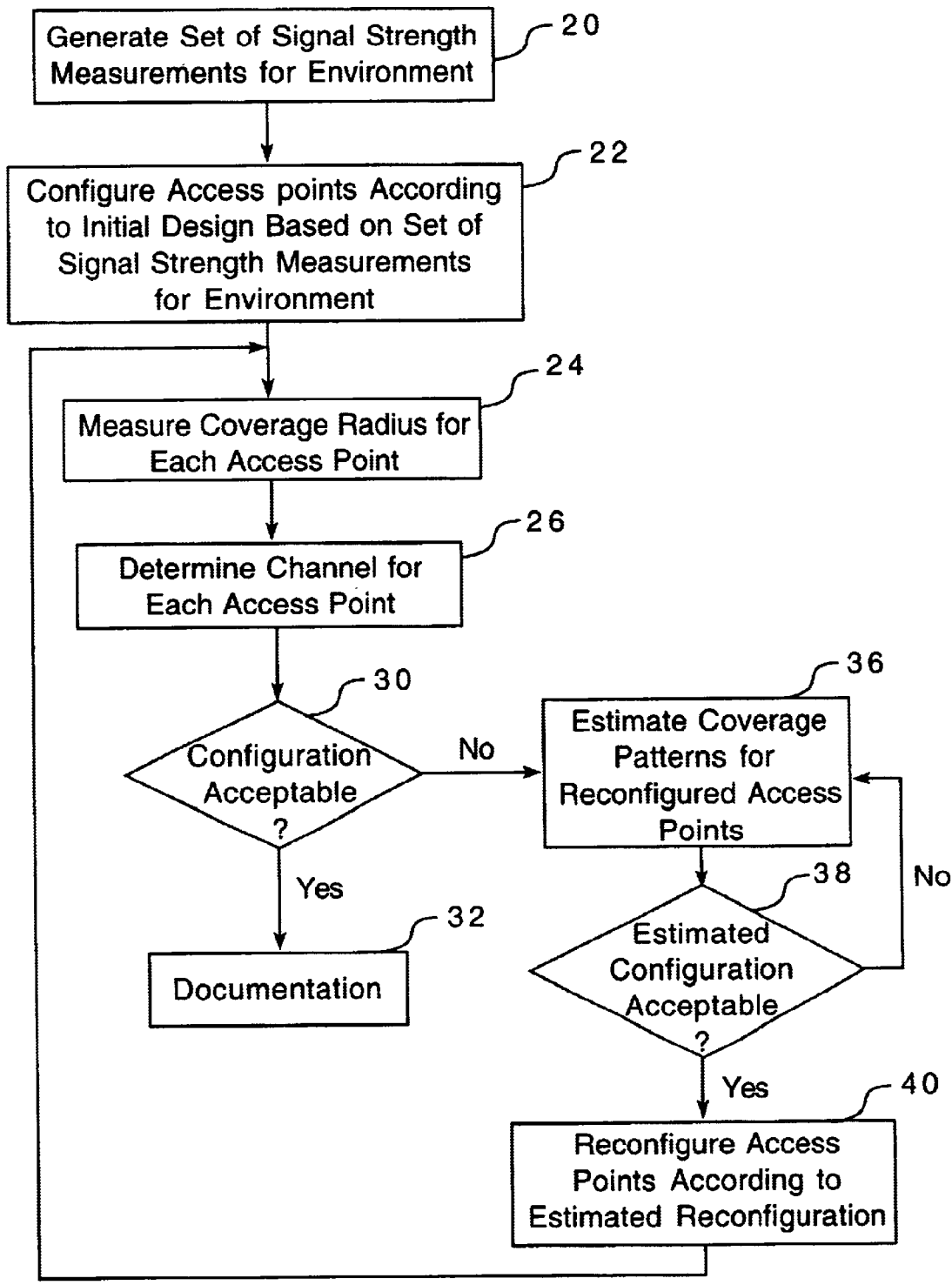
FIG. 2 is a block diagram illustrating a method for configuring a wireless network according to one embodiment.

FIG. 2 is a block diagram illustrating a method for configuring the APs 16 of a wireless network according to one embodiment. The method will be described with reference to the WLAN 10 illustrated in FIG. 1, although benefits of the present invention may be realized in using the method to configure other types of wireless networks. The method begins at block 20, where a set of signal strength measurements within the environment is generated. The set may be generated by placing an AP 16 at various locations within the environment and measuring its radiation pattern, accounting for the signal propagation obstacles in the environment The signal strength measurements may be made in all areas of the environment requiring network coverage, with particular attention paid to the construction of the environment, so that the characteristics within each part of the environment of a particular construction type are understood. Based on the set of signal strength measurements, the environment may be conceptually divided into regions which are relatively isolated from each other, from a wireless signal propagation perspective. Each of these regions may be treated independently in the subsequent steps of the illustrated method.

From block 20, the method advances to block 22, where the APs 16 are located according to an initial design configuration based on the set of signal strength measurements for the environment. According to one embodiment of the present invention, the APs 16 may be located within the environment according to the initial design configuration based on the set of signal strength measurements for the environment as described in U.S. patent application Ser. No. 09/546,852, filed Apr. 10, 2000, which is incorporated herein by reference.

Having established the location of the APs 16 according to the initial design configuration, the process continues to block 24, where the coverage radius for each of the APs 16 of the network 10 is measured. This may be accomplished, for example, by measuring the signal strength for each of the APs 16.

From block 24, the process advances to block 26, where the channel for each of the APs 16 is determined. The channels may be assigned based on the degree of overlapping coverage between APs 16, which may be determined from the measured coverage radii of the APs 16 (block 24). The channels may be, for example, frequency allocations for networks employing frequency division multiple access (FDMA), or time slot allocations for networks employing time division multiple access (TDMA). According to one embodiment, the channels may be assigned to the APs 16 to minimize the overlapping coverage areas for co-channel APs 16. Minimization of overlapping co-channel APs 16 is often desirable for wireless networks to reduce performance degradation. According to one embodiment, channels may be assigned to the APs 16 as described in U.S. patent application Ser. No. 09/546,852, filed Apr. 10, 2000.

From block 26 the method advances to block 30, wherein it is determined whether the configuration of APs 16 is acceptable based on the measurements. The configuration may not be acceptable if, for example, coverage gaps and/or excessive co-channel coverage overlaps exist. If the configuration is acceptable, the process flow advances to block 32, where the final configuration and the measured coverage radius for each of the APs 16 may be documented for archival purposes.

Conversely, if at block 30 it is determined that the configuration is not acceptable, the method may advance to block 36, where coverage patterns for reconfigured APs 16 may be estimated. Consequently, this step does not necessarily require physical relocation of the APs 16 to determine the coverage patterns of the reconfigured APs 16. A method of estimating the coverage patterns for the reconfigured APs 16 will be described further hereinbelow with respect to FIG. 3.

From block 36, the process advances to block 38, where it is determined whether the estimated reconfiguration of the APs 16 is acceptable. If the estimated reconfiguration is not acceptable, the process may return to block 36, where coverage patterns for a yet a different configuration of APs 16 may be estimated. On the other hand, if the estimated reconfiguration is acceptable, the method may continue to block 40, where the APs 16 may be reconfigured according to the estimated reconfiguration. Thereafter, the method may return to block 24 for measurement of the coverage radius for each AP 16 and determination of the channels for the APs (block 26) to determine if the reconfiguration is acceptable (block 30).

Figure 3:
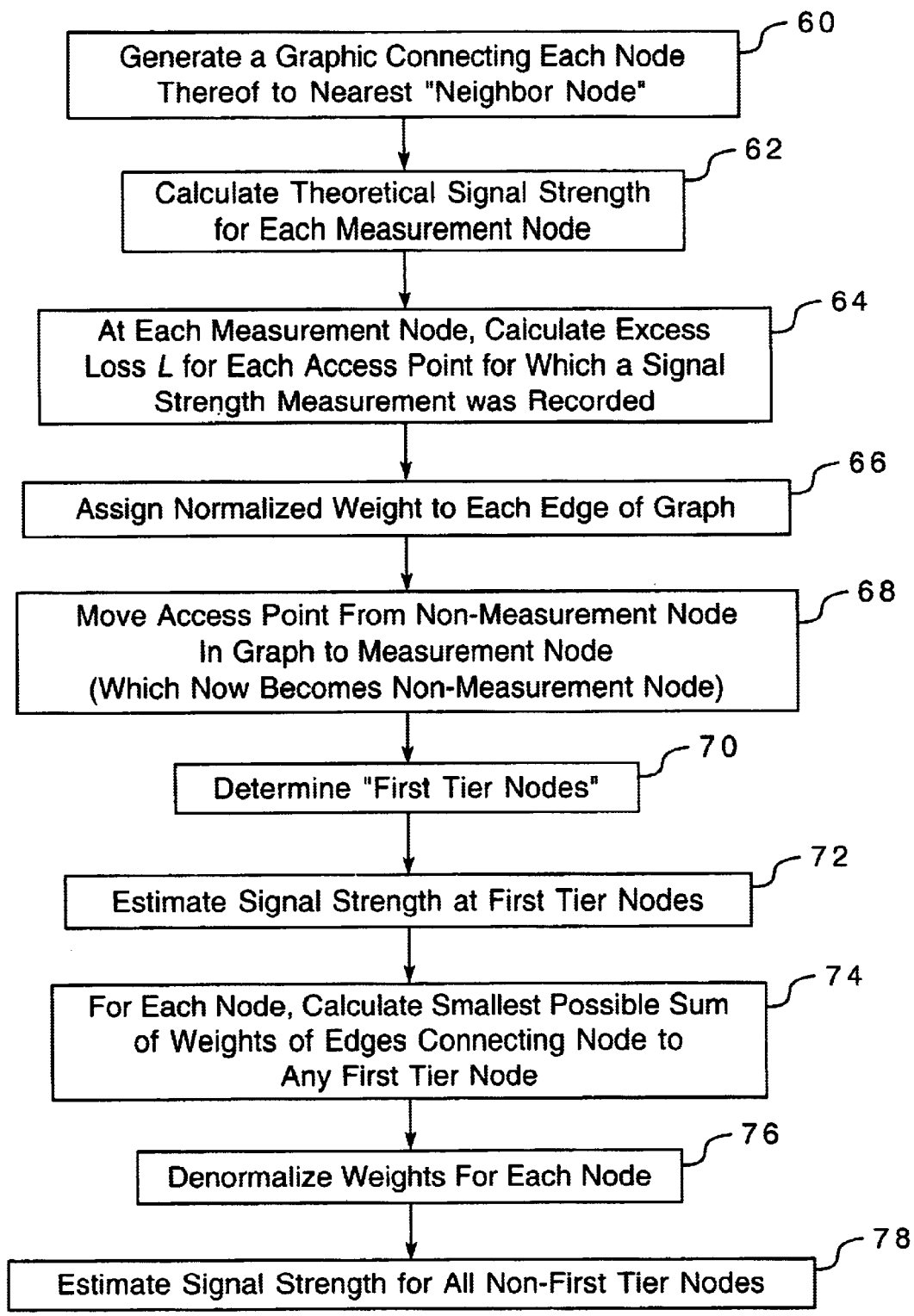
FIG. 3 is a block diagram illustrating a method for estimating the signal strength in the environment of a wireless network for a radio signal transmitted from a relocated access point according to one embodiment.

FIG. 3 is a block diagram illustrating a method for estimating the signal strength in the environment of the WLAN 10 for a radio signal transmitted from a relocated AP 16 according to one embodiment. The method may be used, for example, to estimate coverage patterns of the APs 16 according to a reconfigured design. The method initiates at block 60 where a graph, denoted as G, is generated of the environment of the WLAN 10. The graph G may include a number of nodes (0,0), . . . , (2,1). The nodes may represent physical locations in the environment. The nodes may be classified as so-called "measurement" and "non-measurement" nodes. The physical locations of the APs 16 within the environment may correspond to the non-measurement nodes. The measurement nodes may include the physical locations in the environment where signal strength measurements were recorded when the set of signal strength measurements was generated (see FIG. 2). The graph G may also have edges (or line segments) connecting each node to its nearest "neighbor" node. A particular node's nearest neighbor node may be determined as described hereinbelow with respect to FIG. 4.

From block 60, the process advances to block 62, where the theoretical signal strength for signals transmitted from an AP 16 (at a non-measurement node) at each of the measurement nodes is modeled. According to one embodiment, the theoretical signal strength at the measurement nodes may be modeled according to the relation:

$$s = s^* - 10n\log d \quad (1)$$

where s is the theoretical signal strength in dBm, d is the distance from the particular measurement node to the AP 16 (at the non-measurement node) in meters, n is an attenuation exponent for the radio signal transmitted from the AP 16, and s* is a theoretical signal level at a certain distance in dBm, such as one meter. For a free space environment, n may be 2, and s* may be −32 dBm.

From block 62 the process advances to block 64 where, at each measurement node, the excess loss L may be calculated for each AP 16 for which a signal strength measurement was recorded. The excess loss L, which may be expressed in units of dB, may be calculated according to the relation:

$$L = (s^* - 10n\log d) - s_{measured} \quad (2)$$

where $s_{measured}$ is the measured signal strength at the measurement node in dBm.

From block 64 the method advances to block 66, where a normalized weight $W_{norm}$ is assigned to each edge. The normalized weight may be expressed in units of dB, and may be determined as follows. First, a non-normalized weight W (in dB) may be assigned to each edge such that $$W = L_{neighbor} - L_n \quad (3)$$

where $L_n$ is the value of L at node n, and $L_{neighbor}$ is the value of L at one of n's neighbor nodes. Because it is possible for values of W to be negative, the edge weights may next be normalized. To normalize the edge weights, allow $W_s$ to be the minimum calculated edge weight value for all nodes in G. If $W_s < 0$ then a normalization term NF may be defined as $NF = |W_s|$. Otherwise, NF=0. The normalized weight may then be determined according to the relation:

$$W_{norm} = W + NF \quad (4)$$

Accordingly, a normalized weight may be determined and assigned for each edge of the graph G.

Having determined the normalized weights of the edges at block 66, the process advances to block 68, where the AP 16 is "virtually" moved from a non-measurement node to a measurement node in order that the signal strength of the radio signal transmitted from the AP at the other measurement nodes may be estimated. It should be noted that the AP 16 is not physically moved from one location to another. Rather, the AP 16 is virtually moved with respect to graph G in order that the signal strengths may be estimated for the environment without having to re-locate the AP 16 and generate additional sets of signal strength data.

From block 68 the method continues to block 70 where the "nearest" measurement nodes to the new AP node are determined. The nearest measurement nodes are referred to herein as the "first tier nodes." According to one embodiment of the present invention, the first tier nodes may be determined in accordance with the method described hereinbelow with respect to FIG. 4.

Once the first tier nodes are determined at block 70, the process advances to block 72 where the signal strength for the radio signal transmitted from the new AP node at the first tier nodes are estimated. The signal strength may be estimated according to the relation:

$$s_{est} = s^* - 10n\log d \quad (5)$$

where $s_{est}$ is the estimated signal strength in dBm, and d is the distance between the new AP node and the particular measurement node for which the signal strength is being estimated in meters.

Having estimated the signal strength at each of the first tier nodes at block 72, the method advances to block 74 where the minimum weight $W_{min}$ is calculated for each non-first tier node. The minimum weight $W_{min}$ corresponds to the smallest possible sum of the normalized weights $W_{norm}$ of the edges of the graph G connecting the particular non-first tier node to any first tier node, and may be determined according to Dijkstra's algorithm.

From block 74 the method continues to block 76 where, for each node, the minimum weight $W_{min}$ is denormalized such that:

$$W_{min}' = W_{min} - (NF \cdot N) \quad (6)$$

where $W_{min}'$ is the denormalized weight in dB, and N equals the number of nodes from the new AP node to the particular measurement node along the path the resulting in $W_{min}$.

From block 76 the method advances to block 78 where the signal strength for all non-first tier nodes may be estimated according to the relation:

$$s_{est} = s^* - 10n\log d - W_{min}' \quad (7)$$

In such a manner, the estimated signal strength at a number of measurement nodes, corresponding to physical locations in the environment of the WLAN 10, may be estimated for a "virtual" relocation of an AP 16.

Consequently, the coverage patterns for a reconfiguration of the APs 16 may be efficiently and accurately estimated without having to physically move the APs 16 and generate new sets of signal strength measurements for the environment.

Figure 4:
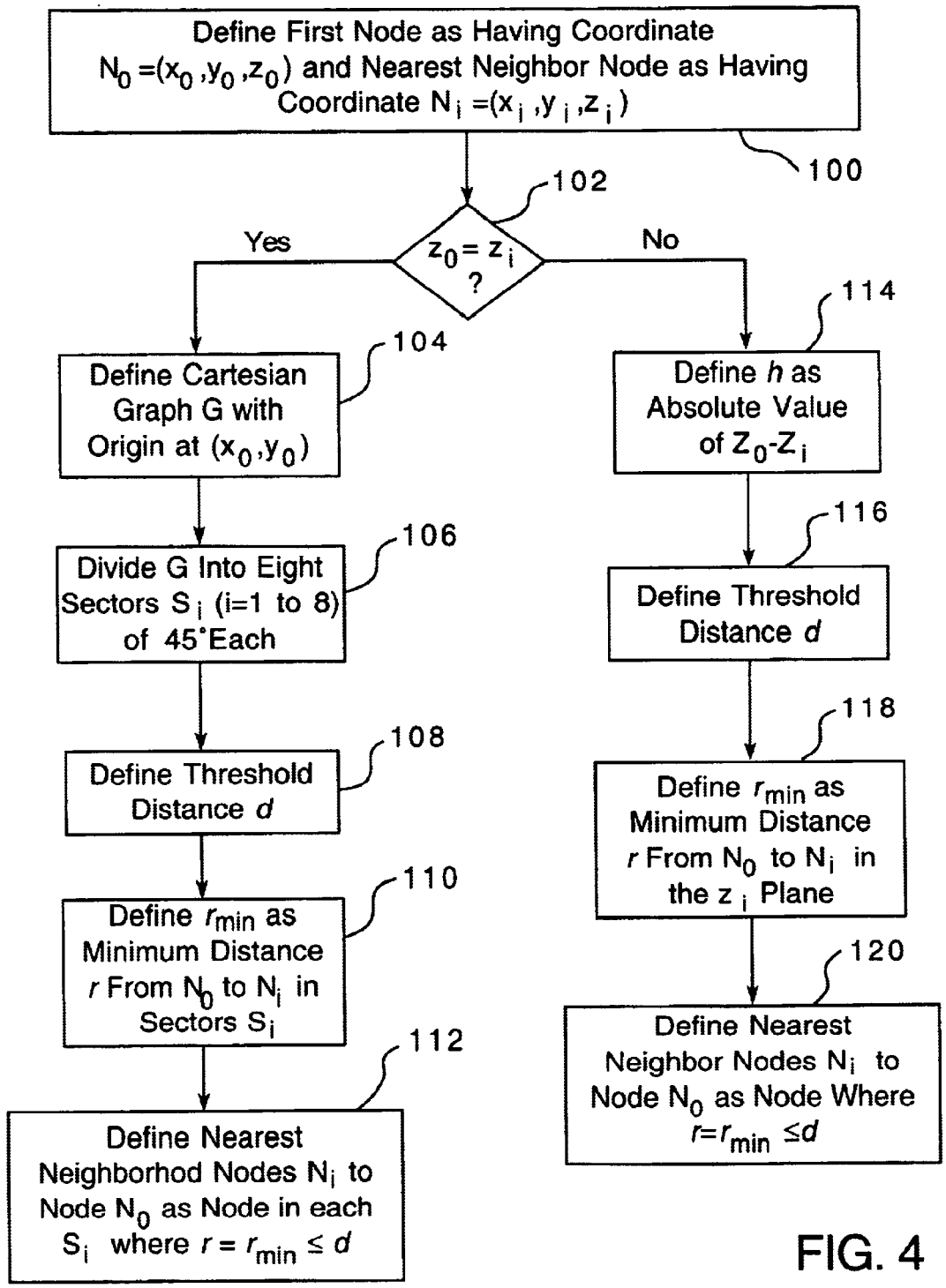
FIG. 4 is a block diagram illustrating a method for determining the nearest node to a particular node according to one embodiment.

FIG. 4 is a block diagram illustrating a method for determining the nearest node to a particular node according to one embodiment. The method initiates at block 100, where the node $N_0$ for which neighbor nodes are to be determined is defined to have a Cartesian coordinate of $(x_0, y_0, z_0)$ and the neighbor nodes are defined to have a Cartesian coordinate of $(x_i, y_i, z_i)$. The z coordinate may represent the height of the environment for the WLAN 10. For an embodiment in which the environment is a building, all nodes on the same floor of the building may have the same z coordinate, and the x, y coordinates may represent locations on the floor of the building.

From block 100 the process advances to block 102 where it is determined whether $z_0 = z_i$ for a particular potential neighbor node. If $z_0 = z_i$, then the process advances to block 104 where a Cartesian graph G is defined with an origin at coordinate $(x_0, y_0)$. From block 104 the process advances to block 106 where the graph G is divided into a number of sectors $S_i$ spanning the (x,y) plane. According to one embodiment, the Cartesian graph G may be divided into eight sectors $S_{1-8}$ of 45° ($\pi/4$ radians) each. The first sector $S_1$ may be defined as $0° < \theta < 45°$, the second sector $S_2$ may be defined as $45° \leq \theta < 90°$, and so on. Each sector $S_i$ may contain a maximum of one "nearest" neighbor node to node $N_0$.

From block 106 the process advances to block 108 where a threshold distance d is defined. The threshold distance d may be, for example, ten meters.

From block 108 the process advances to block 110 where a minimum distance $r_{min}$ is defined, which may correspond to the minimum distance $r_i$ from the node $N_0$ to a node in sector $S_i$. From block 110, the process advances to block 112 where the nearest neighbor nodes are defined to be the nodes $N_i$ in each sector $S_i$ where:

$$r_i = \sqrt{(x_i - x_0)^2 + (y_i - y_0)^2} = r_{min} \leq d \quad (8)$$

Accordingly, there can be at most one nearest neighbor node in each sector $S_i$, depending upon whether $r_{min} \leq d$ for the sector $S_i$.

Returning to block 102, if it is determined that $z_0 \neq z_i$, which corresponds to the potential neighbor node being on a different floor of the building environment of the WLAN 10, the process advances to block 114 where a height h is defined as $|(z_0 - z_i)|$. From block 114 the process may advance to block 116, where the threshold distance d is defined. The threshold distance d may be, for example, ten meters.

From block 116 the process advances to block 118 where the minimum distance $r_{min}$ is defined, which may correspond to the minimum distance $r_i$ from the node $N_0$ to a node in the $z_i$ plane. From block 118, the process advances to block 120 where the nearest neighbor node in the $z_i$ plane is defined to be the node $N_i$ in the $z_i$ plane where:

$$r_i = \sqrt{h^2 + (x_i - x_0)^2 + (y_i - y_0)^2} = r_{min} \leq d \quad (9)$$

Figure 5:
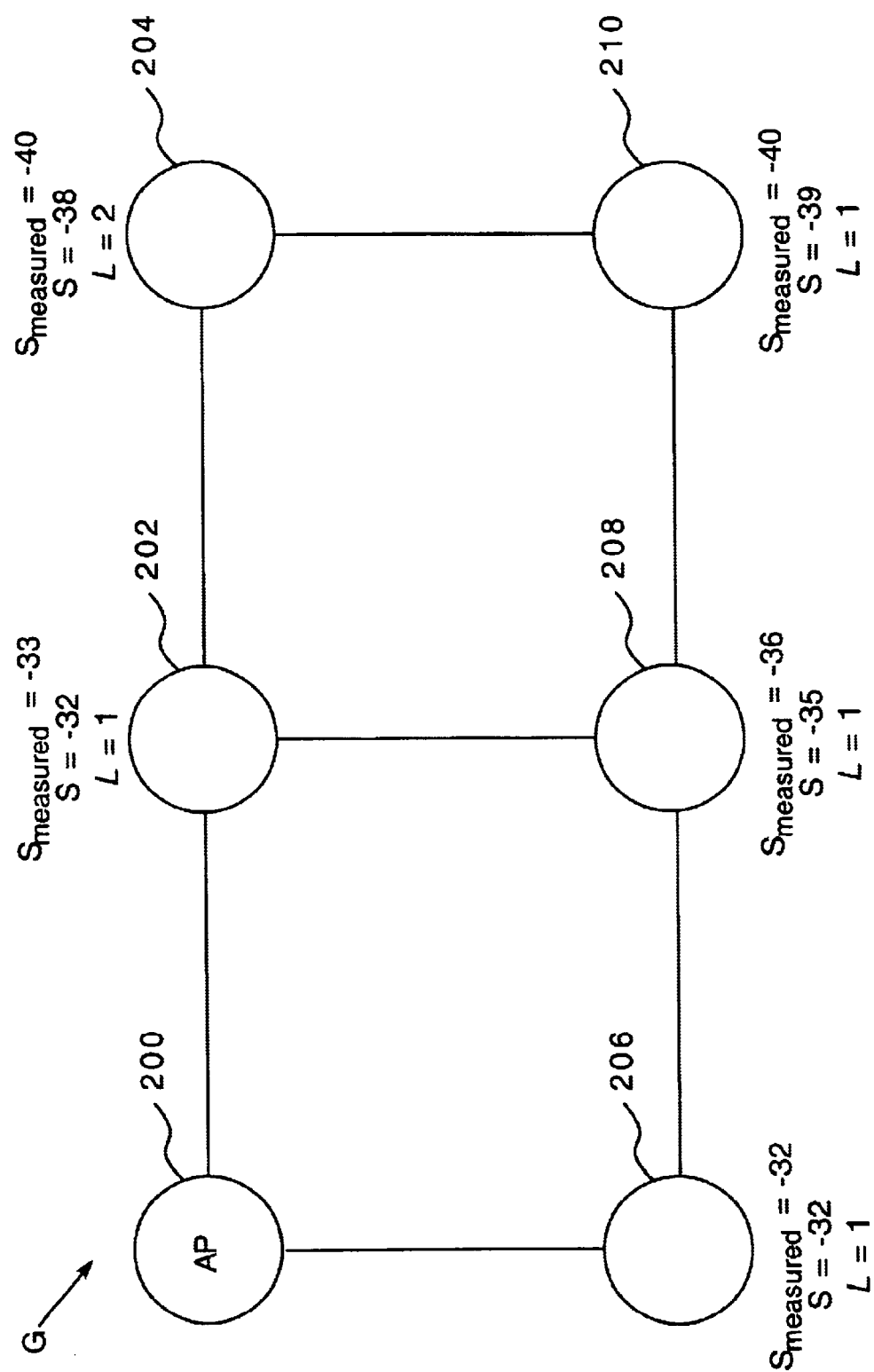
FIG. 5 is an example signal strength diagram generated for a wireless network environment with an access point at an original position.
Figure 6:
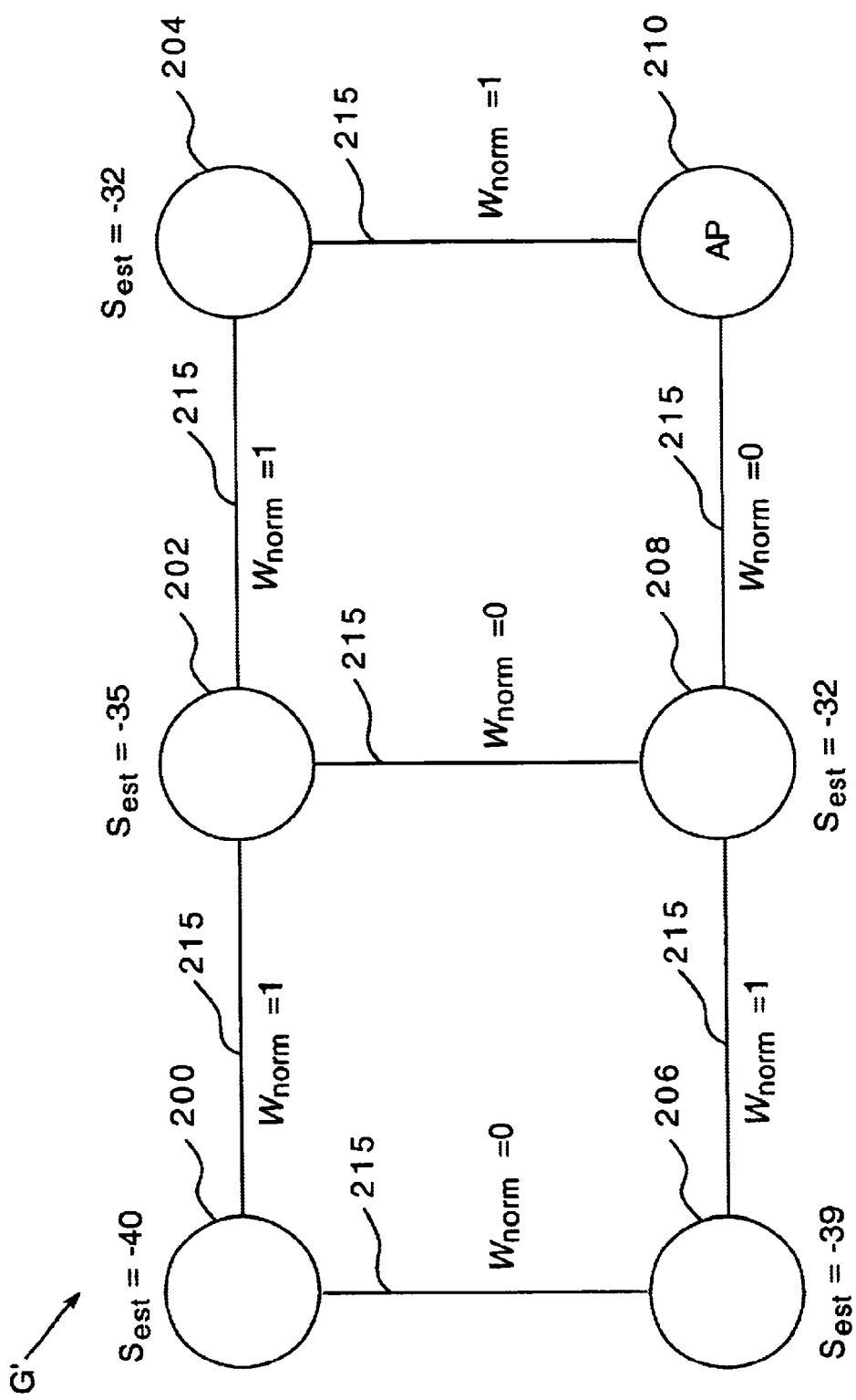
FIG. 6 is an example predictive signal strength diagram for the wireless network of FIG. 5 with the access point at a relocated position.

An example of the processes of FIGS. 3 and 4 will now be described in conjunction with FIGS. 5 and 6. FIG. 5 is an example diagram of a Cartesian graph G generated from the original AP configuration and FIG. 6 is an example diagram of a predictive Cartesian graph G' based on an estimated AP re-configuration according to one embodiment of the present invention. For the purposes of the example provided by FIGS. 5 and 6, the graphs G and G' include only one non-measurement node (designated as AP in FIGS. 5 and 6) and five non-measurement nodes. In FIG. 5, the non-measurement node is node 200 and the measurement nodes are nodes 202, 204, 206, 208, 210. In FIG. 6, the non-measurement node is node 210 and the measurement nodes are nodes 200, 202, 204, 206, 208. Thus, for the purposes of the illustrated example, the signal strengths are estimated at the measurement nodes of the graph G' for an AP located at node 210. In addition, for the purposes of the example provided by FIGS. 5 and 6, all of the nodes have the same z coordinate (i.e., the nodes may be considered to be on the same floor of a building environment.) As described hereinbefore, however, the graphs may include multiple non-measurement nodes and may include nodes with different z coordinates.

In FIG. 5, the theoretical signal strength s, the measured signal strength $s_{measured}$, and the excess loss L are shown for each measurement node. The theoretical signal strength s may be determined pursuant to equation (1), the measured signal strength $s_{measured}$ may be determined based on the initial set of signal strength measurements (see FIG. 2) with an AP 16 at node 200, and the excess loss L may be determined pursuant to equation (2).

In FIG. 6, the normalized weight $W_{norm}$ for each edge 215 of the graph G' is shown as well as the estimated signal strength $s_{est}$ at each of the measurement nodes 200, 202, 204, 206, 208 for an AP 16 located at the node 210. The normalized weight $W_{norm}$ for each of the edges 215 may be determined pursuant to equation (4). The estimated signal strength $s_{est}$ may be determined pursuant to equations (5)–(7).

To determine the estimated signal strength $s_{est}$ for each of the measurement nodes 200, 202, 204, 206, 208, as described hereinbefore, the first tier nodes are determined. For the example of FIG. 6, the first tier nodes were determined to be nodes 204, 208. The estimated signal strength $s_{est}$ for the nodes 204, 208 may be determined pursuant to equation (5), as discussed hereinbefore. For the example of FIG. 5, the estimated signal strength $s_{est}$ for nodes 204, 208 was determined to be $-32$ dBm. The estimated signal strength $s_{est}$ for non-first tier nodes 200, 202, 206 may be determined as described hereinbefore with respect to equations (6) and (7). For example, for node 202, the smallest possible sum of the normalized weights $W_{norm}$ of the edges 215 connecting the node 202 to any first tier node is $W_{min} = 0$ because $W_{norm} = 0$ for the edge 215 between the node 202 and the first tier node 208. Similarly, for node 200, $W_{min} = 1$ because $W_{norm} = 0$ for the edge 215 between the node 200 and the node 206 and $W_{norm} = 1$ for the edge 215 between the node 206 and the first tier node 208. After denormalization of $W_{min}$, the estimated signal strength $s_{est}$ for the non-first tier nodes may be calculated as indicated in FIG. 6 pursuant to equation (7) hereinbefore.

The process of estimating the signal strengths for locations in the environment of the WLAN 10, as described hereinbefore, may be facilitated, for example, by software code to be executed by a processor of a computing device, such as a workstation or a personal computer. The software code may use any suitable computer language such as, for example, C or C++ and may use, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

For example, the software code may include instructions, which when executed by a processor, cause the processor to calculate the parameters s, $s_{est}$, L, etc., based on the set of measured signal strengths and generate text and/or graphical instructions for implementing the wireless network based on the parameters of the particular environment such as, for example, the width of the floor(s) and the number of contiguous floors for which continuous wireless coverage is sought. In addition, the software code may allow a user to graphical "drag" an AP from node to node on a graph of the environment.

Although the present embodiment has been described herein with reference to certain embodiments, those of ordinary skill in the art will recognize that many modifications and variations of the present invention may be implemented. For example, certain steps of the methods described herein may be performed in a different sequence. The foregoing description and the following claims are intended to cover all such modifications and variations.

What is claimed is:

1. A method for estimating signal strengths for a wireless environment, comprising:

measuring a strength of a first radio signal at a plurality of locations in the environment, wherein the first radio signal is transmitted from a radio transmitter at a first location;

estimating the strength of the first radio signal at each of the plurality of locations; and estimating a strength of a second radio signal at the plurality of locations, wherein the second radio signal corresponds to a signal transmitted from one of the plurality of locations, based on a difference between the measured signal strength and the estimated signal strength for the first radio signal.

2. The method of claim 1, wherein estimating the strength of the first radio signal at each of the plurality of locations includes estimating the strength of the first radio signal at each of the plurality of locations based on a distance between each of the plurality of locations and the first location.

3. The method of claim 1, wherein estimating the strength of a second radio signal at the plurality of locations includes:

estimating the strength of the second radio signal at a first set of the plurality of locations; and estimating the strength of the second radio signal at a second set of the plurality of locations based on the estimated signal strengths of the second radio signal for the first set of locations.

4. The method of claim 3, wherein:

estimating the strength of the second radio signal at the first set of plurality of locations includes estimating the strength of the second radio signal at the first set of plurality of locations based on a difference between the measured signal strength and the estimated signal strength at the first set of plurality of locations for the first radio signal; and estimating the strength of the second radio signal at a second set of the plurality of locations includes estimating the strength of the second radio signal at the second set of the plurality of locations based on a least difference between the difference between the measured signal strength and the estimated signal strength at one of the first set of plurality of locations for the first radio signal and a difference between the measured signal strength and the estimated signal strength at the second set of plurality of locations for the first radio signal.

5. The method of claim 1, wherein measuring a strength of the first radio signal at the plurality of locations is performed after estimating the strength of the first radio signal at each of the plurality of locations.

6. A method for estimating signal strengths for a wireless environment, comprising:

measuring a strength of a first radio signal at a plurality of measurement nodes in the environment, wherein the first radio signal is transmitted from a first non-measurement node;

estimating the strength of the first radio signal at each of the plurality of measurement nodes; and estimating a strength of a second radio signal at the plurality of measurement nodes and the non-measurement node, wherein the second radio signal corresponds to a signal transmitted from a first of the plurality of measurement nodes, based on a difference between the measured signal strength and the estimated signal strength for each of the measurement nodes for the first radio signal.

7. The method of claim 6, wherein estimating the strength of the second radio signal at the plurality of measurement nodes and the non-measurement node includes:

generating a graph with the non-measurement node connected to at least one of the plurality of measurement nodes by an edge and with each of the plurality of measurement nodes connected to at least one other measurement node by an edge;

assigning a normalized weight to each edge based on the difference between the measured signal strength and the estimated signal strength for each of the measurement nodes for the first radio signal; and estimating the strength of the second radio signal at the plurality of measurement nodes and the non-measurement node based on the normalized weights of the edges.

8. The method of claim 7, wherein estimating the strength of the second radio signal at the plurality of measurement nodes based on the normalized weights of the edges includes:

estimating the strength of the second radio signal at a first set of the plurality of measurement nodes; and estimating the strength of the second radio signal at a second set of the plurality of measurement nodes based on a least sum of normalized weights of edges connecting each of the second set of measurement nodes to one of the first set of measurement nodes.

9. The method of claim 8, wherein estimating the strength of the second radio signal at the first set of the plurality of measurement nodes includes estimating the strength of the second radio signal at the first set of the plurality of measurement nodes based on a distance between each of the first set of the plurality of measurement nodes and the first measurement node.

10. The method of claim 8, further comprising determining the measurement nodes belonging to the first set of measurement nodes and determining the measurement nodes belonging to the second set of measurement nodes.

11. The method of claim 10, wherein determining the measurement nodes belonging to the first set of measurement nodes includes assigning the measurement nodes within a threshold distance from the first measurement node to the first set of measurement nodes.

12. The method of claim 11, wherein determining the measurement nodes belonging to the second set of measurement nodes includes assigning all measurement nodes not assigned to the first set of measurement nodes to the second set of measurement nodes.

13. The method of claim 6, wherein measuring the strength of the first radio signal at a plurality of measurement nodes in the environment is performed after estimating the strength of the first radio signal at each of the plurality of measurement nodes.

14. A computer readable-medium having instructions stored therein which, when executed by a processor, cause the processor to:
- determine a first estimated signal strength at a plurality of locations in the environment for a first radio signal, wherein the first radio signal is transmitted from a first location; and
- determine a second estimated signal strength at the plurality of locations for a second radio signal, wherein the second radio signal corresponds to a signal transmitted from one of the plurality of locations, based a difference between a measured signal strength at the plurality of locations for the first radio signal and the first estimated signal strengths.

15. The computer-readable medium of claim 14, having further stored thereon instructions which, when executed by the processor, cause the processor to:
- generate a graph with a node representative of the first location connected to at least one node representative of one of the plurality of locations by an edge, and with each node representative of the plurality of locations connected to at least one other node representative of one of the plurality of locations by an edge;
- assign a weight to each edge based on the difference between the measured signal strength and the estimated signal strength for each of the plurality of locations for the first radio signal; and
- estimate the strength of the radio signal at the plurality of locations and the first location based on the weights of the edges for the radio signal transmitted from the first location.

* * * * *

UNITED STATES PATENT AND TRADEMARK OFFICE
CERTIFICATE OF CORRECTION

PATENT NO. : 6,680,924 B2
DATED : January 20, 2004
INVENTOR(S) : Hills

It is certified that error appears in the above-identified patent and that said Letters Patent is hereby corrected as shown below:

Column 4,
Lines 4-5, after "environment", insert -- . --.

Column 5,
Line 3, delete "a" (first occurrence).

Column 6,
Line 21, remove "re-locate" and replace therewith -- relocate --.
Line 53, remove "$W_{min}'$" and replace therewith -- $W'_{min}$ --.
Line 54, remove "$W_{min}'$" and replace therewith -- $W'_{min}$ --.
Line 56, delete "the" (second occurrence).
Line 62, remove "$W_{min}'$" and replace therewith -- $W'_{min}$ --..

Column 7,
Line 27, remove "<" and replace therewith -- $\leqq$ --.
Line 40, Equation 8, equation is misprinted, replace therewith $$-- r_i = \sqrt{(x_i - x_0)^2 + (y_i - y_0)^2} = r_{min} \leq d --$$

Line 59, Equation 9, equation is misprinted, replace therewith $$-- r_i = \sqrt{(x_i - x_0)^2 + (y_i - y_0)^2} = r_{min} \leq d --$$

Line 65, remove "re-configuration" and replace therewith -- reconfiguration --.

Column 8,
Line 12, remove "environment.)" and replace therewith -- environment). --
Line 63, remove "read only" and replace therewith -- read-only --.

Column 9,
Line 8, remove "graphic" and replace therewith -- graphically --.

UNITED STATES PATENT AND TRADEMARK OFFICE
CERTIFICATE OF CORRECTION

PATENT NO.    : 6,680,924 B2
DATED         : January 20, 2004
INVENTOR(S)   : Hills It is certified that error appears in the above-identified patent and that said Letters Patent is hereby corrected as shown below:

Column 11,
Line 16, after "based", insert -- on --.

Signed and Sealed this

Twentieth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,680,924 B2
DATED : January 20, 2004
INVENTOR(S) : Hills

It is certified that error appears in the above-identified patent and that said Letters Patent is hereby corrected as shown below:

Column 4,
Lines 4-5, after "environment", insert -- . --.

Column 5,
Line 3, delete "a" (first occurrence).

Column 6,
Line 21, remove "re-locate" and replace therewith -- relocate --.
Line 53, remove "$W_{min}$'" and replace therewith -- $W'_{min}$ --.
Line 54, remove "$W_{min}$'" and replace therewith -- $W'_{min}$ --.
Line 56, delete "the" (second occurrence).
Line 62, remove "$W_{min}$'" and replace therewith -- $W'_{min}$ --..

Column 7,
Line 27, remove "<" and replace therewith -- $\leqq$ --.
Line 40, Equation 8, equation is misprinted, replace therewith $$-- r_i = \sqrt{(x_i - x_0)^2 + (y_i - y_0)^2} = r_{min} \leq d --$$

Line 59, Equation 9, equation is misprinted, replace therewith $$-- r_i = \sqrt{(x_i - x_0)^2 + (y_i - y_0)^2} = r_{min} \leq d --$$

Line 65, remove "re-configuration" and replace therewith -- reconfiguration --.

Column 8,
Line 12, remove "environment.)" and replace therewith -- environment). --
Line 63, remove "read only" and replace therewith -- read-only --.

Column 9,
Line 8, remove "graphic" and replace therewith -- graphically --.

UNITED STATES PATENT AND TRADEMARK OFFICE
CERTIFICATE OF CORRECTION

PATENT NO.     : 6,680,924 B2
DATED          : January 20, 2004
INVENTOR(S)    : Hills It is certified that error appears in the above-identified patent and that said Letters Patent is hereby corrected as shown below:

<u>Column 11,</u>
Line 16, after "based", insert -- on --.

This certificate supersedes Certificate of Correction issued July 20, 2004.

Signed and Sealed this

Fourteenth Day of September, 2004

JON W. DUDAS
*Director of the United States Patent and Trademark Office*

UNITED STATES PATENT AND TRADEMARK OFFICE
CERTIFICATE OF CORRECTION

PATENT NO.    : 6,680,924 B2
DATED         : January 20, 2004
INVENTOR(S)   : Hills It is certified that error appears in the above-identified patent and that said Letters Patent is hereby corrected as shown below:

Column 4,
Lines 4-5, after "environment", insert -- . --.

Column 5,
Line 3, delete "a" (first occurrence).

Column 6,
Line 21, remove "re-locate" and replace therewith -- relocate --.
Line 53, remove "$W_{min}'$" and replace therewith -- $W'_{min}$ --.
Line 54, remove "$W_{min}'$" and replace therewith -- $W'_{min}$ --.
Line 56, delete "the" (second occurrence).
Line 62, remove "$W_{min}'$" and replace therewith -- $W'_{min}$ --..

Column 7,
Line 27, remove "<" and replace therewith -- $\leqq$ --.
Line 40, Equation 8, equation is misprinted, replace therewith $$-- r_i = \sqrt{(x_i - x_0)^2 + (y_i - y_0)^2} = r_{min} \leq d --.$$

Line 59, Equation 9, equation is misprinted, replace therewith $$-- r_i = \sqrt{h^2 + (x_i - x_0)^2 + (y_i - y_0)^2} = r_{min} \leq d --.$$

Line 65, remove "re-configuration" and replace therewith -- reconfiguration --.

Column 8,
Line 12, remove "environment.)" and replace therewith -- environment). --
Line 63, remove "read only" and replace therewith -- read-only --.

Column 9,
Line 8, remove "graphic" and replace therewith -- graphically --.

UNITED STATES PATENT AND TRADEMARK OFFICE
CERTIFICATE OF CORRECTION

PATENT NO. : 6,680,924 B2
DATED : January 20, 2004
INVENTOR(S) : Hills

It is certified that error appears in the above-identified patent and that said Letters Patent is hereby corrected as shown below:

Column 11,
Line 16, after "based", insert -- on --.

This certificate supersedes Certificate of Correction issued July 20, 2004 and September 14, 2004.

Signed and Sealed this

Thirtieth Day of August, 2005

JON W. DUDAS
*Director of the United States Patent and Trademark Office*